United States Patent [19]
Dittrich

[11] 3,948,111
[45] Apr. 6, 1976

[54] CYLINDER/PISTON AGGREGATE ON A ROTATING SHAFT

[75] Inventor: Otto Dittrich, Bad Homburg vor der Hobe, Germany

[73] Assignee: P.I.V. Antrieb Werner Reimers KG, Bad Homburg, Germany

[22] Filed: Mar. 5, 1974

[21] Appl. No.: 448,355

Related U.S. Application Data

[63] Continuation of Ser. No. 200,009, Nov. 18, 1971, abandoned.

[30] Foreign Application Priority Data
Nov. 27, 1970 Germany............................ 2058399

[52] U.S. Cl............................ 74/230.17 F; 92/117 R
[51] Int. Cl.² .................. F16H 55/52; F16H 55/22
[58] Field of Search......... 74/230.17 F, 217; 92/117

[56] References Cited
UNITED STATES PATENTS
3,052,132  9/1962  Dittrich et al................ 74/230.17 F FOREIGN PATENTS OR APPLICATIONS
1,210,648  2/1966  Germany...................... 74/230.17 F

*Primary Examiner*—Paul E. Maslousky

[57] ABSTRACT

In a cylinder/piston aggregate wherein either the piston or the cylinder is solidly connected to a concentrically arranged shaft and rotating therewith while the respective other element is movable in circumferential and/or in axial direction relative to the first element, the bottom of the cylinder is elastically but tightly connected to the cylinder jacket. It is thereby ensured that in case of deflection of the rotating shaft to one side the inner cylinder wall can adjust itself to a substantially perpendicular position relative to the piston so that the sealing between the cylinder and the piston is not constantly pressed together on one side and relieved from this pressure on the other side.

5 Claims, 7 Drawing Figures

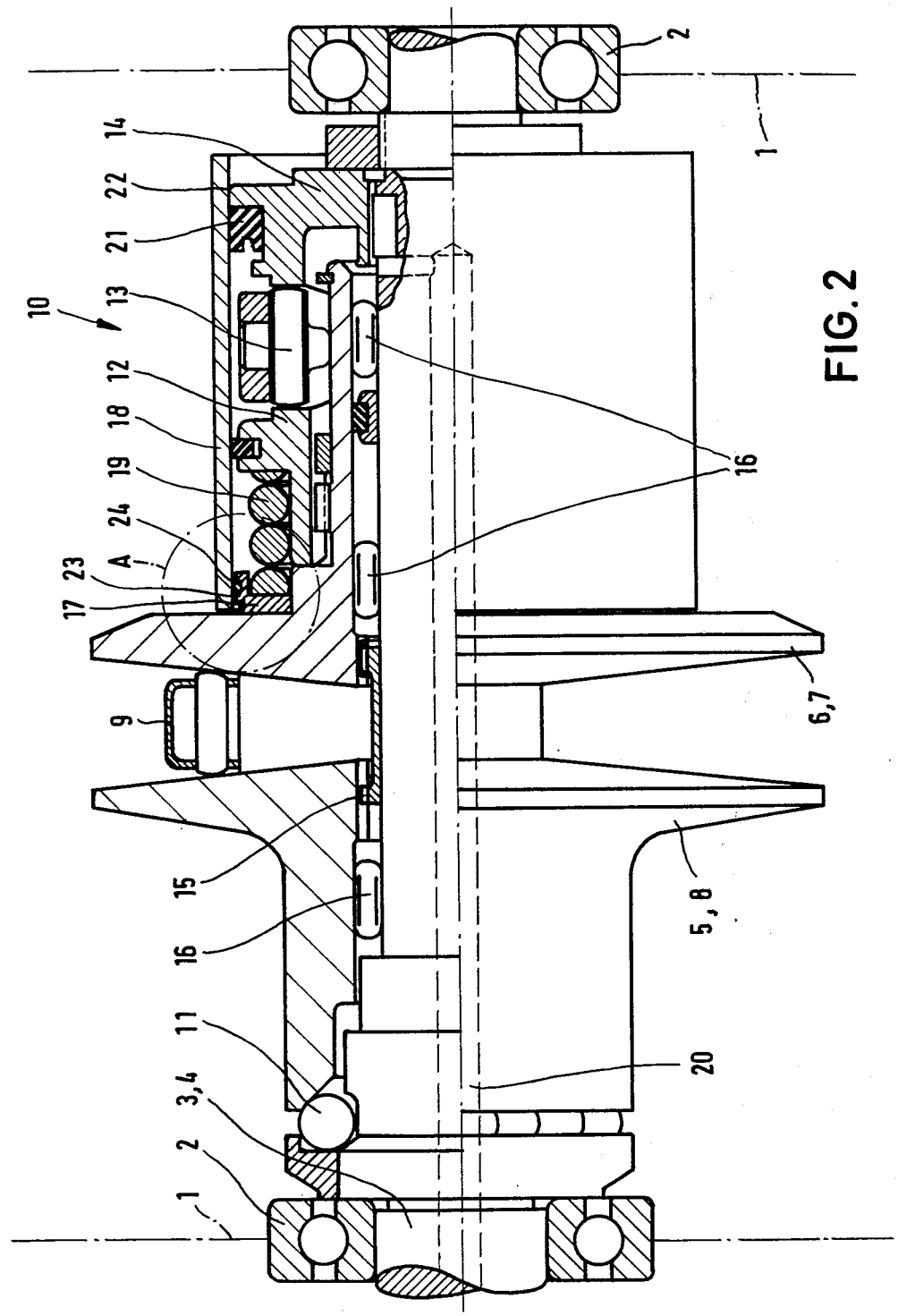

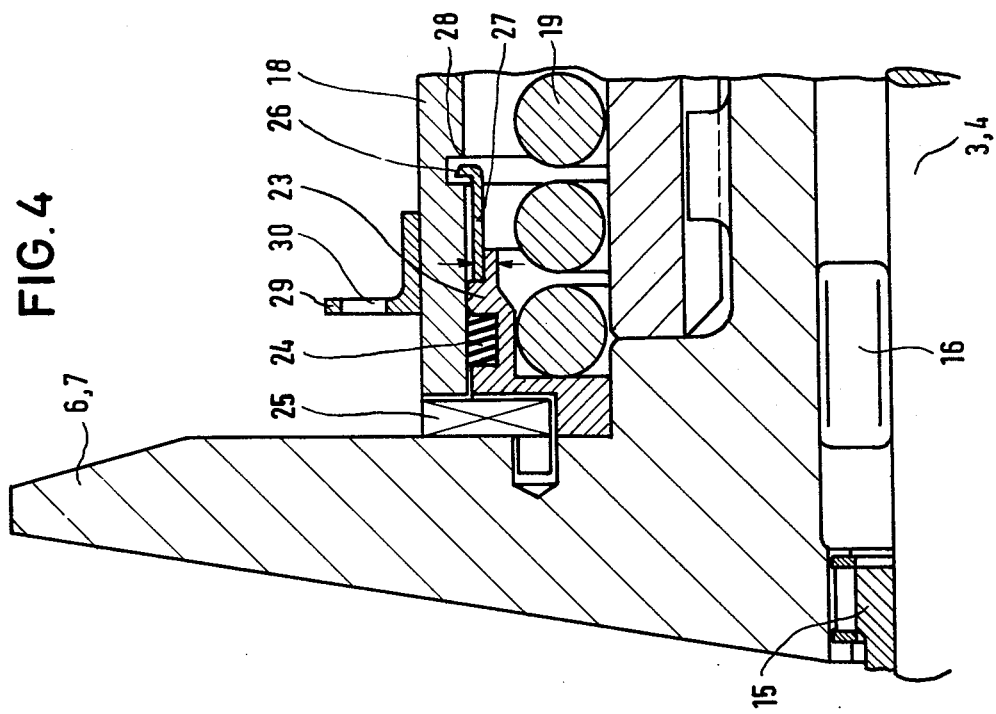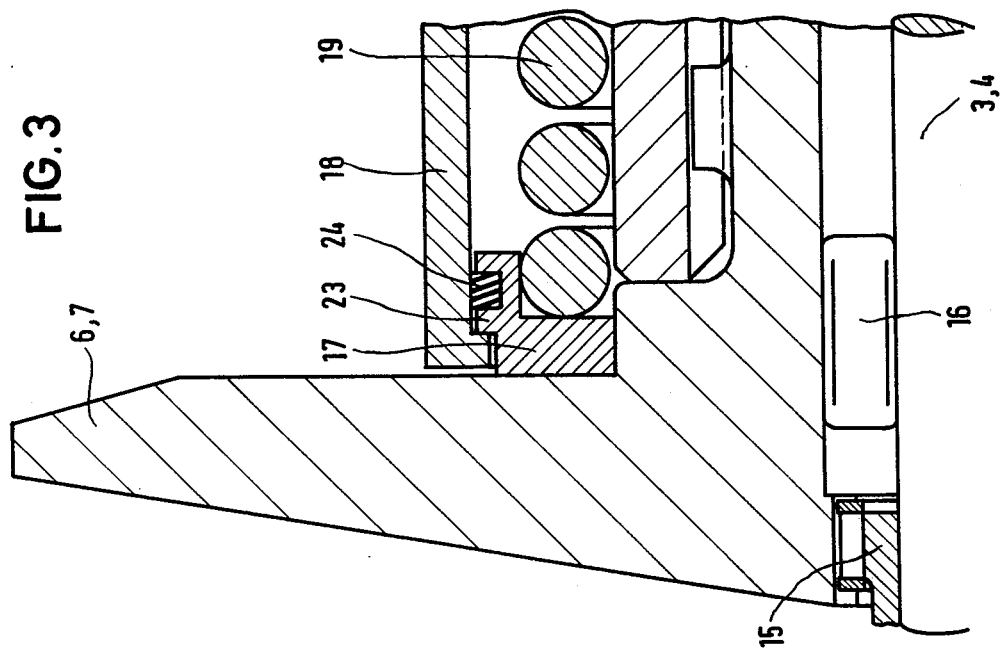

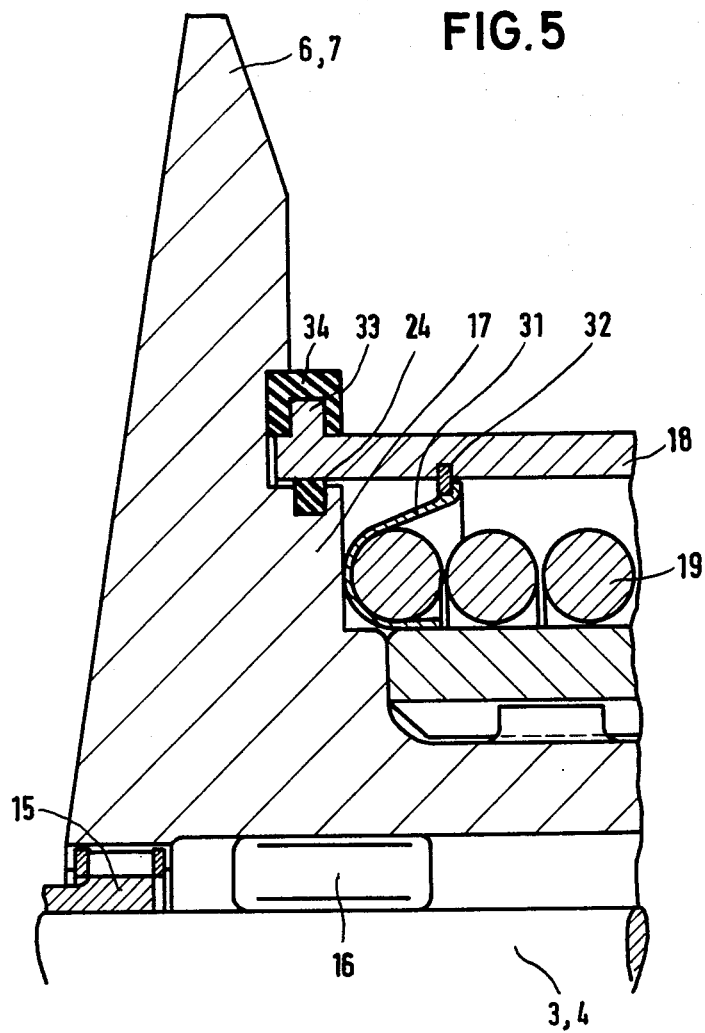

INVENTOR
OTTO DITTRICH
BY
Jennings Bailey, J

CYLINDER/PISTON AGGREGATE ON A ROTATING SHAFT

This is a continuation of application Ser. No. 200,009, filed Nov. 18, 1971, now abandoned.

BACKGROUND OF THE INVENTION

The invention relates to a cylinder/piston aggregate rotating together with a shaft which is concentrically arranged with respect to the aggregate.

The cylinder/piston aggregate is designed for a medium of varying pressure, and either the piston or the bottom of the cylinder is in rigid connection with the shaft. The element not connected to the shaft undergoes a movement in circumferential and/or in axial direction relative to the element connected to the shaft. A seal is provided between the piston and the inner cylinder wall.

Aggregates of this type are, for example, employed in infinitely variable cone pulley transmissions, but the scope of the invention is not limited to this kind of use. In such transmissions the cylinder/piston aggregate is connected to the cone pulley of the pulley pair on one shaft which is displaceable on the shaft in an axial direction. By means of the aggregate the pressure is generated which the pulleys exert on the transmitting belt. This pressure may also be generated purely mechanically by cam elements. In this case the hydraulically generated pressure supports the mechanical pressure. The cam elements are usually arranged within the cylinder and comprise a cam on the axially displaceable cone pulley, a cam on a ring mounted rigidly on the shaft, and roller members inserted between the cams. The cam ring is usually so designed as to constitute at the same time the piston of the cylinder/piston arrangement.

Now, the pressure exerted by the cone pulleys of one transmission side on the transmitting belt plus the pull exerted by the belt on the cone pulleys and on the shaft cause the shaft to be slightly bent in the direction of the other transmission shaft. The shaft deflection in this particular direction prevails throughout all operations of the transmission, i.e. whenever the shaft rotates.

This causes the sealed-off gap between the piston and the cylinder wall to be continuously narrowed and widened in a circumferential direction. Consequently every portion of the seal between the piston and the cylinder wall is alternately pressed together and relieved from pressure with the frequency of the shaft rotation. This effect may be termed the "squeezing effect" and causes the seal to become hot and to get worn, especially at the surfaces in the axial direction, but also at its outer and inner surface because the seal also moves in a circumferential direction on account of the fulling effect. The wear of the seal is particularly heavy if the number of shaft rotations is high and the pressure of the medium to be sealed off is also high. The wear is then so heavy that the sealing ring breaks at the place of the smallest cross section.

The described deflection of the rotating shaft imposes a wear on the seal which differs essentially from the strains to which the transmission seals are normally exposed. These normal strains are brought about by sliding movements in the axial and circumferential directions and the seals are adjusted thereto by a particular shape and design. This different wear caused by the squeezing effect is also indicated by the fact that mainly those portions of the seal are worn which do not directly bring about the sealing effect, i.e. the main body of the sealing ring, which is relatively unelastic compared with the sealing edges of the ring. These conditions prevail with all seals normally known and suitable for this purpose, i.e. seals which do not have too much residual stress, so that the transmission may easily be adjusted to various transmission ratios.

It is, therefore, the object of the present invention to provide a cylinder/piston aggregate which overcomes the above difficulties, and it is a further object to overcome these difficulties without employing other than the usual sealing means between the piston and the inner cylinder wall.

SUMMARY OF THE INVENTION

According to the invention, the above stated objects are attained by a cylinder/piston aggregate wherein the bottom of the cylinder is elastically but tightly connected to the cylinder jacket.

In the aggregate according to the invention the fulling effect between the inner cylinder wall and the piston does not occur because the cylinder can adjust itself in the direction of the chord line of the bent shaft, i.e. a self-centering of the cylinder jacket relative to the piston takes place. Instead of the revolving radial pressure a tilting movement having a component in the axial direction occurs. Such movement can easily be absorbed by the sealing element since it represents only one of the regular types of wear.

It has proven advantageous to design the cylinder jacket so that a portion thereof reaches behind a shoulder of the cylinder bottom and to provide the cylinder bottom with a ring-type seal which is in contact with the inner cylinder wall. In case a spring means is arranged between the cylinder bottom and the piston, a support ring may be provided between the cylinder bottom and the end of the spring means. The latter extends substantially in a radially outward direction. In the cylinder jacket may be mounted a spring ring which reaches behind the support ring and a seal may be provided between the cylinder bottom and the inner cylinder wall. In both cases the proper axial position of the cylinder jacket will be achieved.

In a further developed embodiment of the invention, the cylinder jacket and the cylinder bottom may be secured against relative displacement in circumferential direction. In the area of the cylinder bottom the cylinder jacket may be provided with a shoulder which extends either in a radially inward or in a radially outward direction. By means of this shoulder the cylinder jacket may be mounted in a centering ring consisting of elastic material. By selecting material of the proper elasticity for the centering ring, it is possible to determine the degree of elasticity with which the cylinder jacket is connected to the cylinder bottom. Thereby the cylinder jacket may be allowed the necessary mobility but may, on the other hand, also be provided with sufficient support in the area of the cylinder bottom.

BRIEF DESCRIPTION OF THE DRAWINGS

The invention will be more readily comprehended from the following description when taken in conjunction with the appending drawings, wherein:

FIG. 2 is a partial sectional view of one side of the transmission illustrated in FIG. 1, FIGS. 3 to 5 are embodiments of elastic connections between the cylinder jacket and the cylinder bottom in the area A of FIG. 2, and FIGS. 6 and 7 are simplified illustrations of one side of transmission in a sectional view in axial direction, the deflection of the shaft being shown in an exaggerated manner.

DESCRIPTION OF THE PREFERRED EMBODIMENTS

Figure 1:
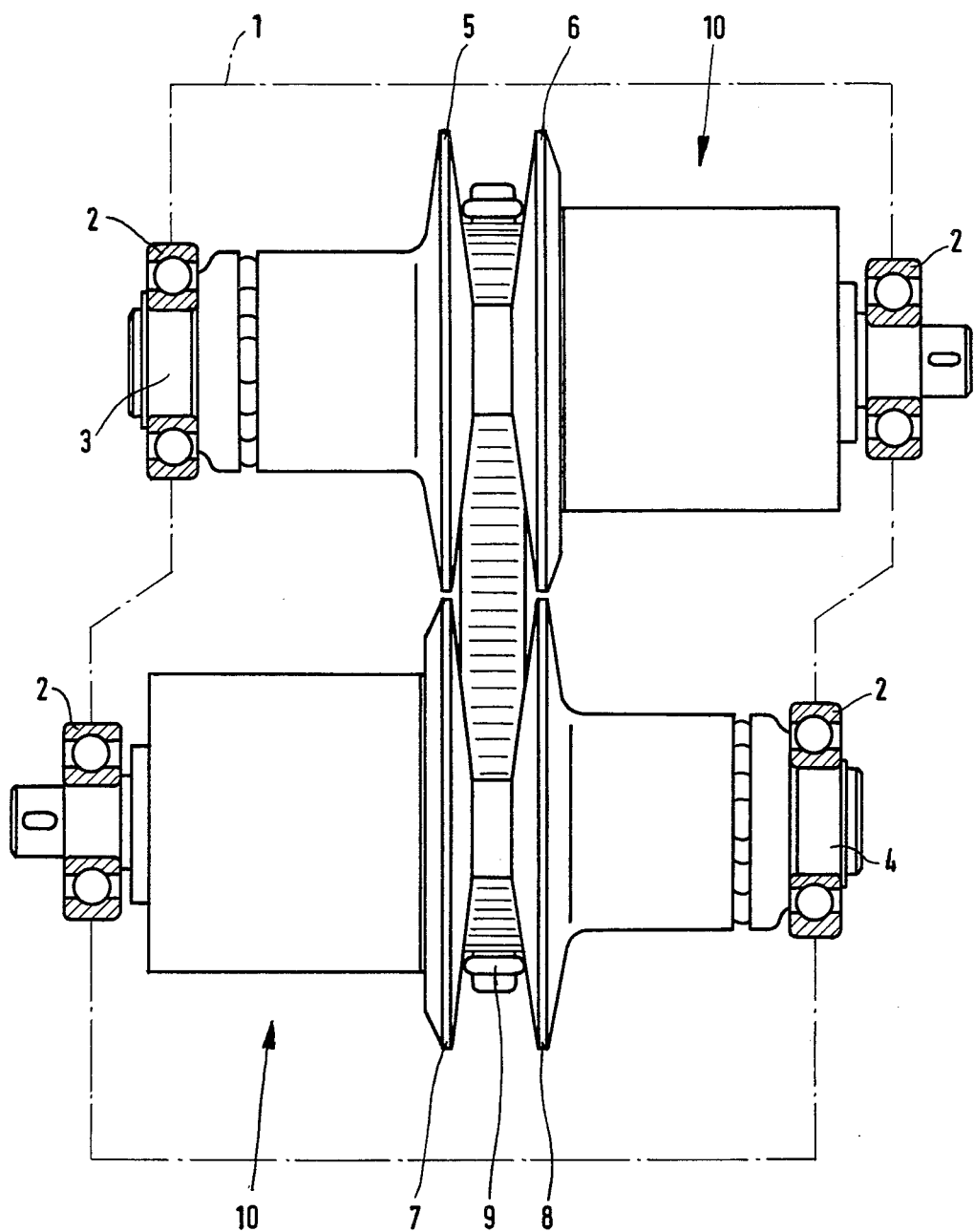
FIG. 1 is a simplified illustration of an infinitely variable cone pulley transmission.

Referring now to the drawings, the infinitely variable cone pulley transmission shown in FIG. 1 is encased in a housing 1 and comprises mainly two revolving shafts 3 and 4 which are mounted in bearings 2. Cone discs 5;6 and 7;8 are mounted on the shafts, and a transmitting belt 9 rotates between the cone discs.

In each cone disc pair 5;6 and 7;8 each cone discs 6 and 7 respectively is displaceable in an axial direction on the shafts 3 and 4 respectively for varying the transmission ratio. To this end each displaceable cone disc 6 and 7 is connected to a cylinder/piston aggregate 10 wherein a hydraulic liquid is contained which is under a varying pressure. The latter being regulated by means of a control device, not shown.

In FIG. 2 one side of the transmission shown in FIG. 1 is illustrated in a partially sectional view. As can be seen from this figure the rigidly mounted cone disc 5;8 abuts indirectly by way of an angular contact ball bearing 11 against the housing 1. The axially displaceable cone disc 6;7 bears against the shaft 3;4 by means of a first cam sleeve 12, rollers 13 and a rigidly mounted second cam sleeve 14. The cam sleeve 14 is at the same time so designed as to form the piston part of the cylinder/piston aggregate, being slidably engaged in the cylinder so that the piston can slide thereover. Both cone pulleys 5;8 and 6;7 respectively are rotatable relative to the shaft 3;4, but they are secured against rotation relative to one another by means of a toothed sleeve 15. In order to reduce the friction between the cone discs 5;8 and 6;7 and the hubs of these discs on the one hand and the shafts 3;4 on the other hand, roller bearings 16 are arranged between the shafts and the cone discs.

Between the machanical pressure device comprising the elements 12 through 14 on the one hand and the cylinder comprising the cylinder part jacket 18 and the bottom 17 on the other hand, a compression spring 19 is arranged for the purpose of keeping the transmitting belt under a certain pressure during idle rotation of the transmission or a stand-still thereof.

The shaft 3;4 is provided with a central bore 20 in axial direction through which a hydraulic liquid is guided into the cylinder/piston aggregate 10. This liquid enters the space between the members 12 and 14 and exerts a pressure towards the left on member 12, increasing the pressure on spring 19, and thereby supports and increases the pressure exerted on the transmitting belt 9 by the cam sleeves 12 through 14. By variation of the hydraulic pressure the transmitting ratio of the transmission may be adjusted. In order to prevent any leakage of the hydraulic liquid a customary ring is arranged between the piston part 14 and the inner wall of the cylinder part.

Owing to the considerable pressure exerted on the transmitting belt 9 by the cone discs 5;6 and 7;8 and further because of the strain within the transmitting belt during transmission operation, the shafts 3;4 are deflected, each one in the direction of the opposite shaft. Since, however, the shafts at the same time are in rotation, the seal 21 is exposed to a squeezing effect which wears the seal out and also forces it into the gap between the piston part 14 and the cylinder part 18.

In order to overcome this disadvantage the cylinder part jacket is elastically connected to the cylinder part bottom 17 so that the squeezing effect of the seal 21 does not occur. As shown in FIG. 2 the elastic connection is brought about by a flange 23 on the cylinder part bottom 17 behind which a shoulder of the cylinder part jacket reaches. This shoulder prevents relative axial movement between the cylinder jacket and the cylinder bottom. The flange 23 is provided with a seal 24 which is in contact with the inner wall of the cylinder part jacket 18.

In FIG. 3 the mentioned elastic connection between the cylinder part bottom 17 and the cylinder part jacket 18 as shown in the section A in FIG. 2 is illustrated on an enlarged scale.

Further embodiments of this elastic connection are illustrated in the FIGS. 4 and 5, also on an enlarged scale.

According to FIG. 4 there is a toothed element 25 provided which is in mesh with the cylinder part jacket 18 on the one side and with the axially displaceable cone disc 6;7 on the other side. The element 25 prevents any rotation of the discs relative to one another. In this embodiment the cylinder part jacket 18 is supported in the axial direction by means of at least two spring elements 27 which are spaced equally from one another on the circumference of a flange 23. Each spring element is provided with a leg 26 projecting in a radially outward direction and engaging a groove 28 in the cylinder part jacket 18. On the latter there is, further, mounted a ring 29 which comprises holes 30 for inserting screws for balancing the cylinder part jacket.

In FIG. 5 there is shown a support ring 31 clamped between the compression spring 19 and the cylinder part bottom 17 and extending substantially in a radially outward direction. The cylinder part jacket 18 comprises a spring ring 32 which extends behind the support ring. Further, near the cylinder part bottom 17 the cylinder part jacket 18 is provided with a shoulder 33 by means of which the cylinder part jacket is mounted in a centering ring 34 consisting of elastic material. The elasticity of the material is so chosen that the cylinder part jacket has the necessary mobility but is at the same time safely mounted against any vibrations which may possibly occur.

Figure 6:
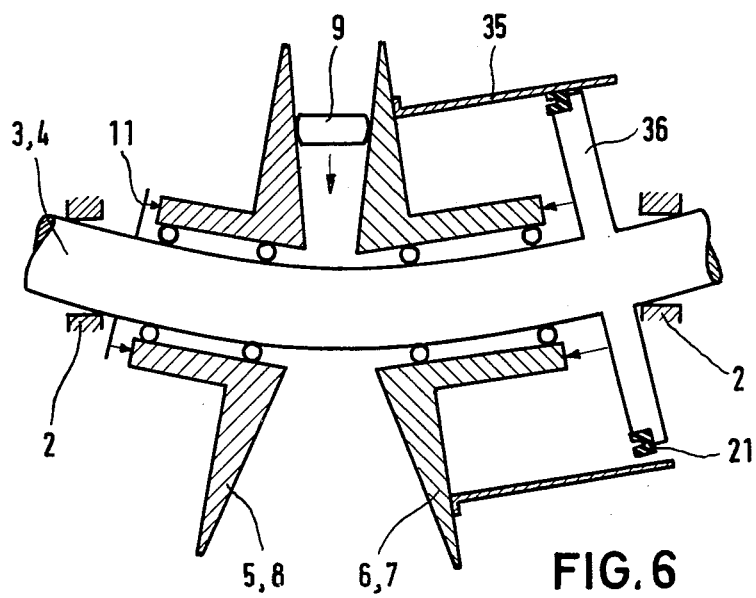
Figure 7:
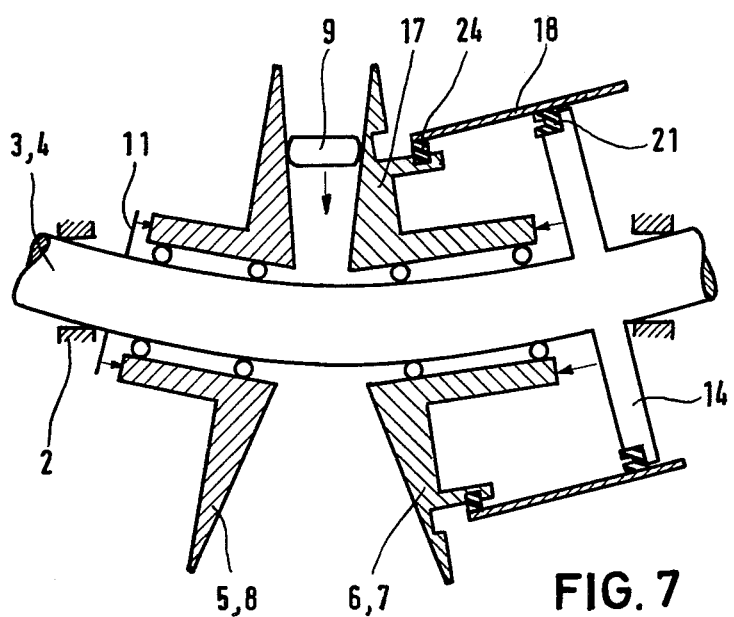

In FIGS. 6 and 7 there is shown in an exaggerated and simplified manner one side of the transmission with the deflected shaft. The effect of the elastic connection of the cylinder part bottom to the cylinder part jacket is outlined with particular reference to these two figures.

In FIG. 6 the conditions are shown which prevail if the cylinder part jacket 35 is rigidly connected to the displaceable cone discs 6 (or 7 respectively). As can readily be seen from the exaggerated deflection of the shaft 3 (or 4 respectively), caused by the strain of the transmitting belt 9, this leads to a tilting of the piston 36 relative to the cylinder part jacket 35. As a consequence thereof the seal 21, is in a rotating manner, alternately pressed together in radial direction and then relieved from this pressure. This causes a heavy friction of the seal against the piston part surface in the axial direction and consequently an early wear of the sealing.

In the embodiment shown in FIG. 7 the cylinder part jacket 18 is connected elastically to the cylinder part bottom 17 by means of a seal 24. This prevents the above discribed heavy friction on the seal 21 because the cylinder part jacket 18 can adjust itself to a perpendicular and centered position relative to the piston part 14 according to the degree of deflection of the shaft 3 (or 4 respectively). The seal 21 now undergoes a practically uniform wear around all of its circumference.

What is claimed is:

1. A cylinder/piston aggregate concentrically arranged on a rotating shaft and comprising a cylinder part comprising a cylinder jacket (18) and a cylinder bottom (17) and a piston part (14) mounted in the cylinder part for relative axial sliding movement therebetween, a first of the parts (14) being rigidly connected to the shaft while the second part (17,18) is movable relative to the shaft in at least one of the axial and circumferential directions, and a seal (21) between the piston part (14) and the inner wall of the cylinder jacket (18) wherein the improvement comprises means (24,34) yieldably and fluid-tightly connecting the cylinder jacket (18) and the cylinder bottom (17) with one another, whereby to permit the cylinder jacket (18) to tilt relative to the cylinder bottom (17), whereby the jacket (18) may undergo a self-centering adjustment with respect to the cylinder bottom (17) and the piston part (14) upon bending of the shaft, said connecting means including means (33) to prevent relative axial movement between the cylinder jacket (18) and the cylinder bottom (17).

2. A cylinder/piston aggregate as claimed in claim 1, wherein said connecting means comprises a flange (23) on the cylinder bottom behind which the cylinder jacket reaches, and a second seal (24) positioned on the flange in contact with the inner wall of the cylinder jacket.

3. A cylinder/piston aggregate as claimed in claim 1, wherein a compression spring (19) is mounted between the piston part (14) and the cylinder bottom (17), wherein said connecting means comprises a support ring (31) between the cylinder bottom (17) and the compression spring (19), the support ring (31) extending in a substantial radially outward direction, a spring ring (32) mounted in the inner wall of the cylinder jacket (18), the spring ring (32) reaching behind the support ring (31) for establishing indirectly an elastic connection between the cylinder bottom and the cylinder jacket, and a seal (24) positioned along the circumference of the cylinder bottom (17) in contact with the inner wall of the cylinder jacket (18).

4. A cylinder/piston aggregate as claimed in claim 3, wherein the support ring (31) has a bent-over portion which engages the end of the compression spring.

5. A cylinder/piston aggregate as claimed in claim 1, wherein said connecting means comprises an annular shoulder (33) on the cylinder jacket close to the cylinder bottom and a centering ring (34) engaging and providing an elastic support for the annular shoulder.

* * * * *